L. BRADLEY.
SULFURIC ACID MANUFACTURE.
APPLICATION FILED FEB. 24, 1917.
1,284,175.
Patented Nov. 5, 1918.
2 SHEETS—SHEET 1.
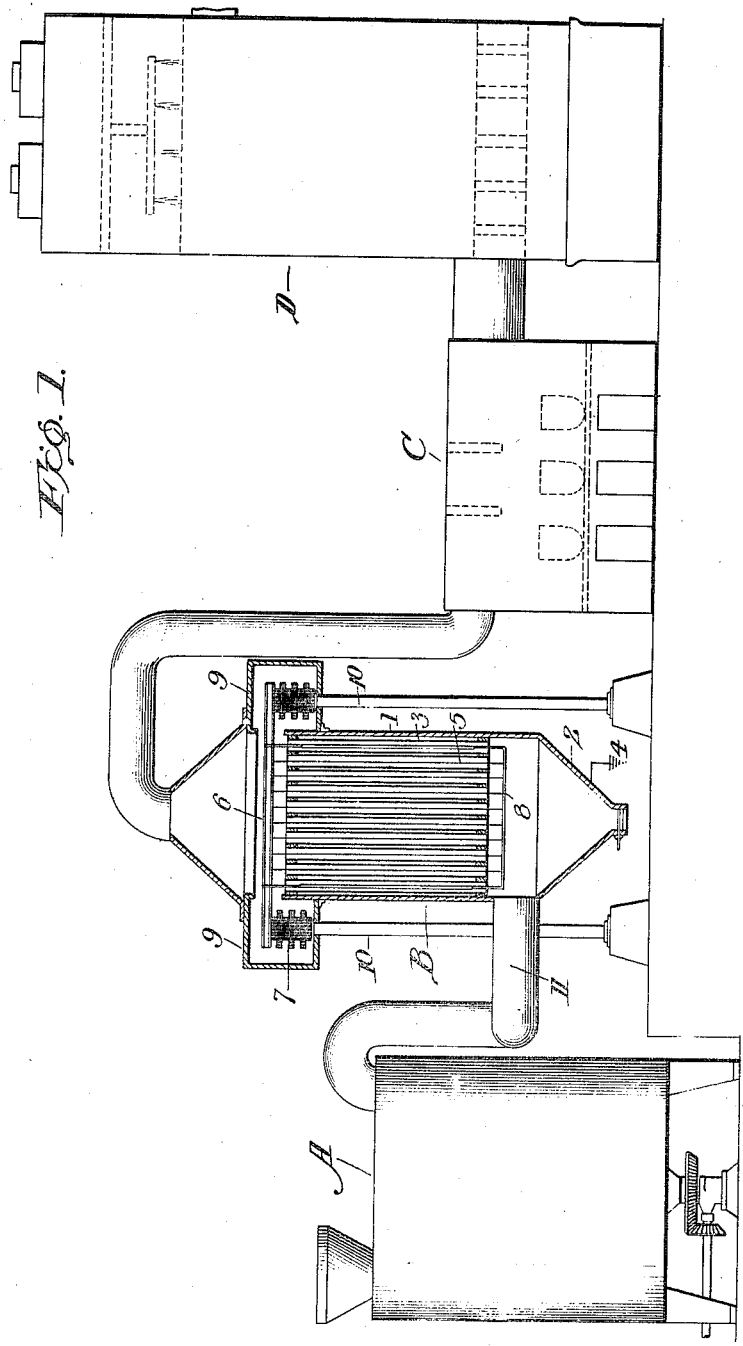

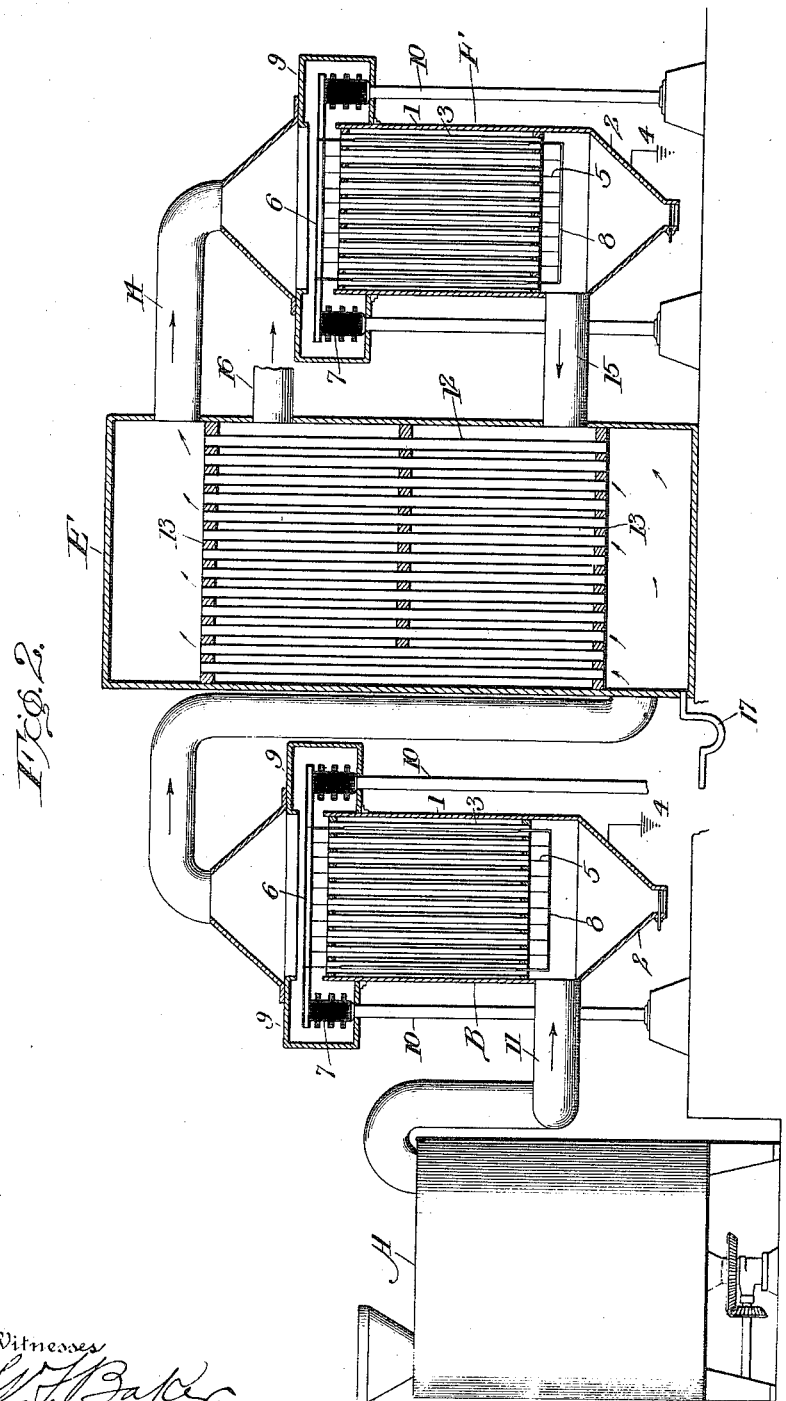

UNITED STATES PATENT OFFICE.

LINN BRADLEY, OF EAST ORANGE, NEW JERSEY, ASSIGNOR TO RESEARCH CORPORATION, OF NEW YORK, N. Y., A CORPORATION OF NEW YORK.

SULFURIC-ACID MANUFACTURE.

1,284,175.  Specification of Letters Patent.  Patented Nov. 5, 1918.

Application filed February 24, 1917. Serial No. 150,797.

*To all whom it may concern:*

Be it known that I, LINN BRADLEY, a citizen of the United States, residing at East Orange, in the county of Essex and State of New Jersey, have invented certain new and useful Improvements in Sulfuric-Acid Manufacture, of which the following is a specification.

This invention relates to the manufacture of sulfuric acid and sulfuric anhydrid, the objects of the invention being to provide an improved process of manufacture, and an improved apparatus for use in connection with said process. The present improvements relate particularly to the purification and treatment of pyrites burner gases, or of similar gaseous mixtures containing sulfur dioxid. The invention is advantageously applied both to the manufacture of sulfuric acid by the chamber process, and to the manufacture of sulfuric anhydrid and sulfuric acid by the contact process. According to my invention the burner gases, while at a temperature above the point at which any substantial condensation of sulfuric acid can take place, are subjected to the action of the known apparatus for electrical precipitation. Thereby the dust, under which term I include all suspended or non-gaseous particles in the gas-stream, is rapidly deposited in a substantially dry state; while the gaseous bodies, including practically all of the sulfuric acid (which exists as a gas at the operating temperature) pass on with the main gas-stream, the sulfuric acid being recovered at a later operating stage.

I have found that the rapidity of deposition of dust from the highly heated burner gases by the known apparatus for electrical precipitation is such as to permit, with a proper arrangement of apparatus, a practically complete elimination of dust while avoiding such fall of temperature of the gas as would permit the simultaneous deposition of sulfuric acid from the mists or clouds which tend to form when such gas-streams are cooled. This permits me to modify in a highly advantageous manner, as hereinafter more fully pointed out, the present methods of manufacture of sulfuric acid and of sulfuric anhydrid.

Certain forms of apparatus operating in accordance with my invention are illustrated in the accompanying drawings, wherein—

Figure 1 is a side elevation, parts being shown in section, of certain plant elements applicable to the manufacture of chamber acid in accordance with my invention; and Fig. 2 is a similar view of a modified apparatus, applicable more particularly to the contact process.

Referring to Fig. 1, A represents a sulfurdioxid generator or pyrites burner which may be of any usual or approved type, and B an electrical precipitator hereinafter more fully described. C indicates the usual niter pots and D a Glover tower, both of which may be of any approved design.

As illustrated by way of example, the electrical precipitator B comprises a casing 1 which may be of iron, constructed with a converging bottom 2 for the collection and discharge of the precipitate. The collecting electrodes 3 have the form of a battery of open-ended, vertical, parallel tubes, which may be in electrical contact with the casing, the latter being suitably grounded as conventionally indicated at 4. The discharge electrodes are indicated as wires, rods or strips 5, vertically positioned and extending axially through the tubular collecting electrodes. The discharge electrodes are carried by transverse conductors 6 which extend horizontally above the tubes 3 and are supported by insulators 7. 8 indicates any suitable tensioning means, for example a weight or spreader, whereby the discharge electrodes are held in their axial position within the tubes. The insulators 7 are mounted in lateral extensions of the casing indicated by the numeral 9, and are therefore maintained at approximately the same temperature as the gases traversing the precipitator.

In the particular form illustrated these insulators are carried by vertical posts or other appropriate supports 10, located outside of the casing 1 but extending into the extensions 9. In practice, the discharge electrodes are connected to the negative pole of a source of high electrical potential, as is now well understood in this art, the discharge between the respective electrodes serving to precipitate all suspended matters.

It will be observed that the highly heated burner gases, with their burden of dust, pass directly through flue 11 into the precipitator; and it is essential to the successful practice of my invention that the temperature within the precipitator be maintained above the temperature at which sulfuric acid, (which is always present to a greater or lesser extent in the burner gases) is deposited as a liquid. In case the temperature were permitted to fall materially below this point, the sulfuric acid would collect upon the insulators 7, quickly rendering them useless for their intended purpose. Moreover, if mists or clouds of sulfuric acid are permitted to form in the precipitator by condensation, such clouds are quickly precipitated with the dust, such precipitation resulting not only in loss of acid through neutralization by the iron oxid and other bases of the dust, but materially increasing the difficulty of removing and handling the precipitate, which may then assume the condition of a sludge. Furthermore, the substantial absence of acid in the liquid phase permits the employment in the construction of the precipitator, including the electrodes, of such inexpensive materials as cast and wrought iron, etc. Ordinarily, the location of the precipitator in immediate proximity to the burners will suffice to maintain the proper working temperature, which should preferably materially exceed 317° C. (the boiling-point of 98 per cent. sulfuric acid); but it will be understood that the precipitator or any portion thereof may if required be covered with any of the usual heat-insulating materials, or its proper working temperature may be maintained by any suitable means.

The gases are thus substantially freed from suspended impurities, and in case the sulfuric acid is to be prepared in accordance with the well-known chamber process, the gases may pass directly to the niter pots, and thence to the usual Glover tower and to the chambers.

In the modification illustrated in Fig. 2, the gases from the burner A pass directly to the electrical precipitator B as above described, and the resulting dust-free gases pass thence to a heat-interchange device E, wherein their temperature is reduced, this reduction of temperature being of course accompanied by a separation of sulfuric acid in the liquid phase. From the heat-interchanger the gases pass to such supplemental purifiers as may be required for the removal of the impurities which have passed through the electrical precipitator B in gaseous form. The now completely purified and incidentally cooled gases are preferably returned to the heat-interchanger E, being thereby reheated to such temperature that they may pass directly to the contact chambers, or to such approximation to this temperature as is attainable under the particular conditions. For this purpose, as illustrated by way of example in Fig. 2, the heat-interchanger E may comprise vertical tubes 12 extending between upper and lower tube sheets 13. The dust-free gases from the precipitator pass upwardly through these tubes, and thence to the supplemental purifying system through flue 14. The fully purified gases return to the heat-interchanger through flue 15, circulate around the tubes 12, and being suitably reheated, pass to the contact chambers through flue 16. Any sulfuric acid deposited in the heat-interchanger as a consequence of the cooling is trapped off at 17.

Although the supplemental purification of the gases for the removal of impurities which passed the precipitator B in the gaseous phase may be carried out in any desired manner, I prefer to interpose in the stream of gases at a point following the heat-interchanger E, a second electrical precipitator F which may be of the same type as the precipitator B or of any other desired type, but the operating temperature of which is below that at which the sulfuric acid separates as a cloud or mist. Such precipitator should preferably be constructed of materials not affected by sulfuric acid under the particular operating conditions. It is known that certain of the residual impurities, notably arsenic, tend to associate themselves with the cloud or mist of sulfuric acid which results from the slow cooling of the gases; and the function of the second precipitator is to deposit this mist, with its associated impurities, with the result that substantially all of the arsenic and related impurities may be collected in a relatively very small proportion of the total sulfuric acid, and may be prevented from contaminating the bulk of the product. Such supplemental precipitator may be included at any suitable point in the circuit after the temperature of the gases has fallen to the desired degree, as for example, following the Glover tower D in Fig. 1, or following the heat-interchanger E in Fig. 2.

Certain advantages which are secured through the practice of my invention have already been mentioned. The principal advantages may be briefly summarized as follows:—

(1) Since the temperature of the gas is maintained, during the deposition of the dust, above the point at which sulfuric acid can exist in the liquid phase, the insulators retain their efficiency, which would not be the case were even a film of sulfuric acid deposited upon their surfaces. Condensation of acid upon the insulators is effectually prevented by locating them in the interior of the precipitator, whereby they attain substantially the temperature of the gas-stream.

(2) The dust is precipitated is a sufficiently dry state to permit easy removal and handling.

(3) The acid which would otherwise be lost through neutralization by the basic constituents of the dust is saved, and is later recovered in comparatively clean and usable form.

(4) Owing to the absence of sulfuric acid in the liquid phase the corrosion problems are eliminated so far as the precipitator is concerned, and it becomes practicable to use in its construction sheet iron and other inexpensive materials.

(5) The bulk of the arsenic contained in the burner gases traverses the precipitator without possiblity of conversion to arsin ($AsH_3$) through contact with iron in presence of aqueous acid. Thereby the subsequent removal of arsenic by supplemental purification is greatly simplified. This subsequent purification may be carried out entirely in brick-lined flues, etc., or otherwise under conditions to avoid contact of the condensed acid with iron surfaces.

(6) The heat-interchange between the hot gases issuing from the precipitator, and the fully purified gases about to enter the contact chambers, may be carried out with a much higher efficiency than is possible with dust-laden gases; for fine dust collecting on the surfaces of the interchange apparatus is found to posses an extraordinary retarding effect upon the heat transference. This retarding effect is particularly marked when the gases carry zinc oxid.

(7) A high degree of heat-conservation may be attained, inasmuch as the precipitating apparatus is relatively very small, as compared for example with a dust chamber capable of operating with any comparable degree of efficiency. Furthermore, the apparatus requires but few openings through which air may enter to dilute and cool the gas, or moisture to condense the sulfur trioxid which is always present in the burner gases. The precipitator moreover may readily be covered with suitable heat-insulation.

(8) This heat-conservation is especially advantageous in the application of the invention to the chamber process, the heat of the gases being conveyed in greater measure to the Glover tower, the operating efficiency of which is thereby improved.

(9) It is found practicable, owing to the absence of dust to prepare a clean and salable niter cake in the niter pots.

It is to be understood that my invention may be carried into effect in apparatus differing widely in construction and design from that herein illustrated and described.

While I have particularly described my invention in its application to the maufacture of sulfuric acid by the chamber and contact processes, it is to be understood that it is applicable in its broader aspects to the purification of sulfur dioxid for any purpose, for example as a preliminary to the preparation of sulfurous acid solutions or liquid sulfur dioxid, etc. So far as I am aware, I am the first to provide in connection with means for generating sulfur dioxid at a high temperature, means for freeing the generated gases from dust while substantially conserving the heat of the gases, whereby this heat may be utilized in the subsequent production of sulfuric acid or of sulfur trioxid from the dust-free gases.

I claim:—

1. In the purification of dust-laden gases containing sulfur dioxid and sulfuric acid, the step which consists in separating the dust while avoiding substantial deposition of sulfuric acid.

2. In the purification of dust-laden gases containing sulfur dioxid and sulfuric acid, the step which consists in electrically precipitating dust from the gas-stream while maintaining a sufficient temperature to avoid substantial deposition of sulfuric acid.

3. In the manufacture of sulfuric acid, the step which consists in effecting a practically complete elimination of dust from the burner gases while substantially retaining the heat of combustion thereof, whereby the simultaneous precipitation of sulfuric acid is avoided.

4. In the manufacture of sulfuric acid, the step which consists in electrically precipitating the dust from the burner gases while substantially retaining the heat of combustion thereof, whereby the simultaneous precipitation of sulfuric acid is avoided.

5. In the manufacture of sulfuric acid, the steps which consist in electrically precipitating dust from a gas-stream containing sulfur dioxid and sulfuric acid while maintaining a sufficient temperature to avoid substantial deposition of sulfuric acid, and thereafter cooling the gas and depositing sulfuric acid therefrom.

6. In the manufacture of sulfuric acid, the steps which consist in electrically precipitating dust from a gas-stream containing sulfur dioxid and sulfuric acid while maintaining a sufficient temperature to avoid substantial deposition of sulfuric acid, thereafter cooling the gas to form a cloud or mist containing sulfuric acid and associated impurities, and removing said cloud.

7. In the manufacture of sulfuric acid, the steps which consist in electrically precipitating dust from a gas-stream containing sulfur dioxid and sulfuric acid while maintaining a sufficient temperature to avoid substantial deposition of sulfuric acid, thereafter cooling the gas to form a cloud or mist containing sulfuric acid and associated impurities, and electrically precipitating said cloud.

8. In the manufacture of sulfuric acid, the steps which consist in effecting a practically complete elimination of dust from the burner gases while substantially retaining the heat of combustion thereof, and then cooling the gases by transferring heat therefrom to a cooler portion of the gas-stream.

9. In the manufacture of sulfuric acid, the steps which consist in effecting a practically complete elimination of dust from the burner gases while substantially retaining the heat of combustion thereof, further purifying the gas, and then reheating the purified gas by heat-interchange with the hot dust-free gases.

10. In the manufacture of sulfuric acid, the steps which consist in electrically precipitating dust from a gas-stream containing sulfur dioxid while maintaining a sufficient temperature to avoid substantial deposition of sulfuric acid, further purifying the gas, and then re-heating the purified gas by heat-interchange with the hot dust-free gas.

11. In apparatus for the manufacture of sulfuric acid, the combination with a sulfur-dioxid generator and the elements of a sulfuric acid plant, of an electrical dust-precipitator in position to receive the highly heated gases from the generator and to deliver them at a high temperature to the said sulfuric acid plant.

12. In apparatus for the manufacture of sulfuric acid, the combination of a sulfur-dioxid generator, an electrical dust-precipitator in position to receive the highly heated gases from said generator, and means for cooling the dust-free gases issuing from said precipitator.

13. In apparatus for the manufacture of sulfuric acid, the combination of a sulfur-dioxid generator, an electrical dust-precipitator in position to receive the highly heated gases from said generator, and a heat-interchanging device for cooling the dust-free gases issuing from said precipitator.

14. In apparatus for the manufacture of sulfuric acid, the combination of a sulfur-dioxid generator, an electrical dust-precipitator in position to receive the highly heated gases from said generator, supplemental means for further purifying said dust-free gases, and means for effecting an interchange of heat between the purified gases and the hot dust-free gases.

15. In apparatus for the manufacture of sulfuric acid, the combination with a sulfur-dioxid generator, of two electrical precipitators arranged in series in the line of the gas-flow, and means interposed between said precipitators for cooling the gases.

16. In apparatus for the manufacture of sulfuric acid, the combination with a sulfur-dioxid generator, of two electrical precipitators arranged in series in the line of the gas-flow, and a heat-interchanger interposed between said precipitators.

17. In the manufacture of sulfuric acid, the steps which consist in electrically precipitating suspended particles from the burner gas at temperatures respectively above and below the condensing point of sulfuric acid.

In testimony whereof I affix my signature in presence of two witnesses.

LINN BRADLEY.

Witnesses:
M. D. EGBERT,
R. H. C. THIEDE.